(12) United States Patent
Andken et al.

(10) Patent No.: US 10,915,246 B2
(45) Date of Patent: Feb. 9, 2021

(54) CLOUD STORAGE FORMAT TO ENABLE SPACE RECLAMATION WHILE MINIMIZING DATA TRANSFER

(71) Applicant: NetApp, Inc., Sunnyvale, CA (US)

(72) Inventors: Benjamin Bradford Andken, Bellevue, WA (US); Sumeeth Channaveerappa Kyathanahalli, Mountain View, CA (US); Sharad Jain, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 23 days.

(21) Appl. No.: 16/411,880

(22) Filed: May 14, 2019

(65) Prior Publication Data

US 2019/0347009 A1 Nov. 14, 2019

Related U.S. Application Data

(60) Provisional application No. 62/671,071, filed on May 14, 2018.

(51) Int. Cl.
*H04L 29/08* (2006.01)
*G06F 3/06* (2006.01)

(52) U.S. Cl.
CPC ............ *G06F 3/0608* (2013.01); *G06F 3/064* (2013.01); *G06F 3/067* (2013.01); *G06F 3/0652* (2013.01)

(58) Field of Classification Search
None
See application file for complete search history.

(56) References Cited

U.S. PATENT DOCUMENTS

| 6,816,941 | B1 | 11/2004 | Carlson |
| 8,285,681 | B2 | 10/2012 | Prahlad |
| 8,396,841 | B1 | 3/2013 | Janakiraman |
| 9,002,805 | B1 | 4/2015 | Barber et al. |
| 9,052,942 | B1 | 6/2015 | Barber et al. |
| 9,063,946 | B1 | 6/2015 | Barber et al. |
| 9,417,917 | B1 | 8/2016 | Barber et al. |

(Continued)

FOREIGN PATENT DOCUMENTS

| WO | 2012158654 A2 | 11/2012 |
| WO | 2017197012 A1 | 11/2017 |

OTHER PUBLICATIONS

International Search Report and Written Opinion for Application No. PCT/US2019/032199 dated Sep. 16, 2019, 8 pages.

*Primary Examiner* — Ryan Bertram
*Assistant Examiner* — Trang K Ta
(74) *Attorney, Agent, or Firm* — Troutman Pepper Hamiton Sanders LLP (Rochester)

(57) ABSTRACT

A method, non-transitory computer readable medium, and device that assists with managing cloud storage includes identifying a portion of data in a data unit identified for deletion in the metadata. The identified portion of the data identified for delete is compare to a threshold amount. Deletion of the data unit from a first storage object is deferred when the determined portion of data identified for deletion is less than the threshold amount. A second storage object with a portion of data unmarked for deletion in the data unit is generated when the determined portion of data marked for deletion is equal to the threshold amount, wherein the second storage object has a same identifier as the first storage object.

20 Claims, 5 Drawing Sheets

(56) References Cited

U.S. PATENT DOCUMENTS

| | | |
|---|---|---|
| 9,772,916 B2 | 9/2017 | Rangasamy |
| 2005/0080814 A1* | 4/2005 | Hailey ................... G06Q 10/10 |
| 2011/0161291 A1* | 6/2011 | Taleck ................ G06F 11/1458 |
| | | 707/622 |
| 2012/0089569 A1 | 4/2012 | Mason |
| 2012/0159098 A1* | 6/2012 | Cheung .............. G06F 12/0261 |
| | | 711/162 |
| 2012/0233228 A1 | 9/2012 | Barton |
| 2012/0278569 A1* | 11/2012 | Kawakami ............ G06F 3/0653 |
| | | 711/162 |
| 2013/0185258 A1 | 7/2013 | Bestler |
| 2016/0092496 A1 | 3/2016 | Dietterich et al. |
| 2017/0277597 A1* | 9/2017 | Dillon ................. G06F 11/1453 |
| 2018/0232305 A1 | 8/2018 | Davis |
| 2020/0019620 A1* | 1/2020 | Sarda .................... G06F 16/113 |

\* cited by examiner

CLOUD STORAGE FORMAT TO ENABLE SPACE RECLAMATION WHILE MINIMIZING DATA TRANSFER

This application claims the benefit of Provisional Patent Application Ser. No. 62/671,071 filed May 14, 2018, which is hereby incorporated by reference in its entirety.

FIELD

The disclosure generally relates to the field of data processing, and more particularly to database and file management or data structures.

BACKGROUND

An organization can specify a data management strategy in a policy(ies) that involves data recovery and/or data retention. For data recovery, an application or program creates a backup and restores the backup when needed. The term backup is generally defined as a collection of data stored on (usually removable) non-volatile storage media for purposes of recovery in case the original copy of data is lost or becomes inaccessible; also called a backup copy. For data retention, an application or program creates an archive. The term archive is generally defined as a collection of data objects, perhaps with associated metadata, in a storage system whose primary purpose is the long-term preservation and retention of that data. Although creating an archive may involve additional operations (e.g., indexing to facilitate searching, compressing, encrypting, etc.) and a backup can be writable while an archive may not be, the creation of both involves copying data from a source to a destination.

Data management or protection strategies increasingly rely on cloud service providers. A cloud service provider maintains equipment and software without burdening customers with the details. The cloud service provider provides an application programming interface (API) to customers. The API provides access to resources of the cloud service provider without visibility of those resources.

DETAILED DESCRIPTION

Figure 1:
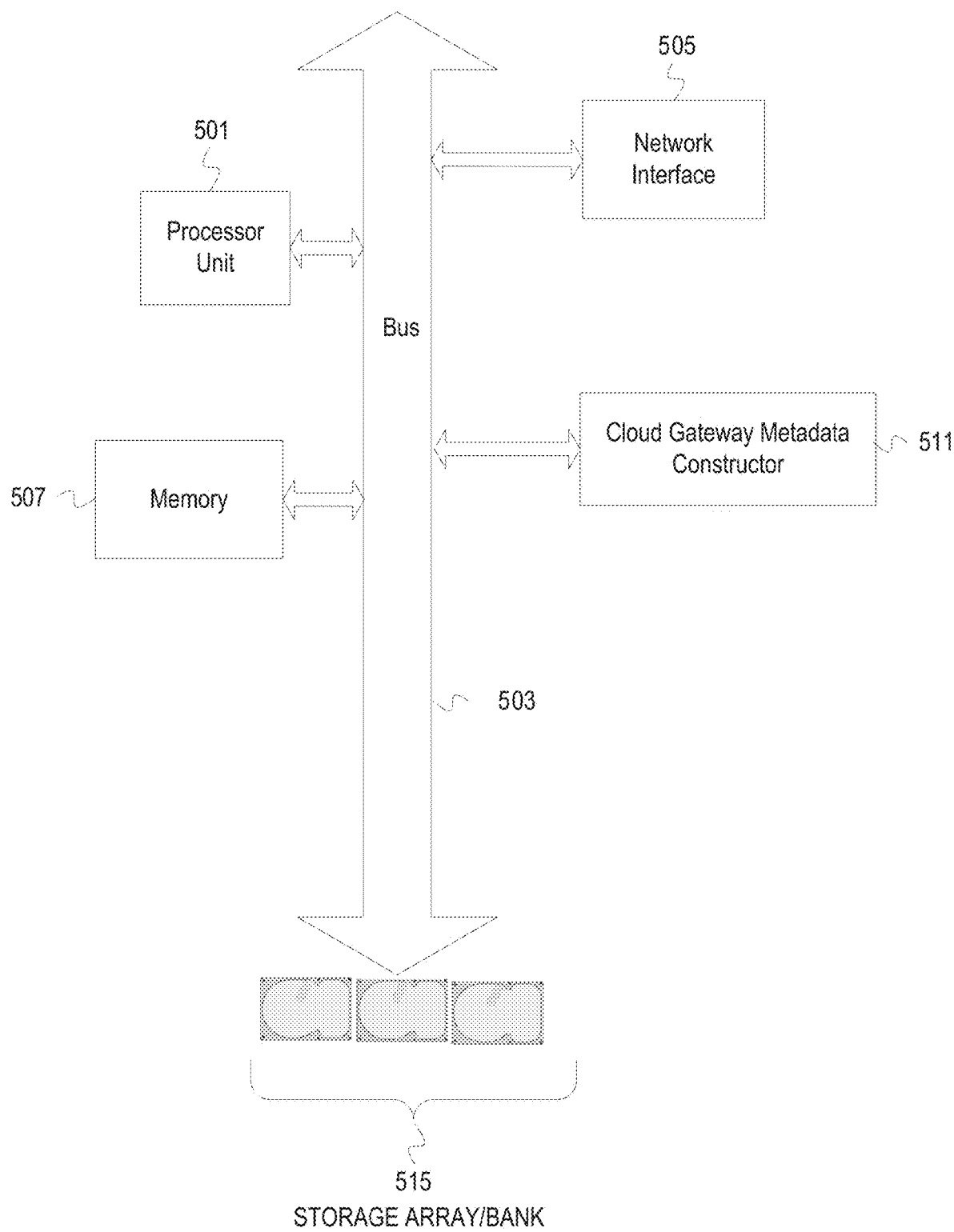
FIG. 1 is an exemplary block diagram of a storage appliance.

FIG. 1 depicts an example computer system with a cloud gateway metadata constructor. The computer system includes a processor unit 501 (possibly including multiple processors, multiple cores, multiple nodes, and/or implementing multi-threading, etc.). The computer system includes memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.). The system also includes a cloud gateway metadata constructor 511 that can perform either or both of the deferred deletion operations and the peer appliance keystone based metadata transition. Any one of the previously described functionalities may be partially (or entirely) implemented in hardware and/or on the processor unit 501. For example, the functionality may be implemented with an application specific integrated circuit, in logic implemented in the processor unit 501, in a co-processor on a peripheral device or card, etc. Further, realizations may include fewer or additional components not illustrated in FIG. 5 (e.g., video cards, audio cards, additional network interfaces, peripheral devices, etc.). The processor unit 501 and the network interface 505 are coupled to the bus 503. Although illustrated as being coupled to the bus 503, the memory 507 may be coupled to the processor unit 501. The system also includes a storage array or storage bank 515 (e.g., disk array, flash storage bank, hybrid storage, etc.)

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

While migrating backups to cloud storage and/or storing archival data to cloud storage can aid organizations in avoiding or reducing the costs of maintaining storage resources, many still seek to control the costs of accessing those resources in cloud storage. A cloud storage provider will often charge for each transaction (e.g., ingest or retrieval) as well as the amount of storage used. In many cases, an object stored in cloud storage includes multiple segments or units of data and an organization will not delete an entire object. To delete a segment or unit of an object, a storage appliance will retrieve the object, delete select segments/units, and write a new object back to cloud storage. Thus, the costs for these transactions to perform a deletion of data to reduce the cost of storage used can incur additional transactional costs that exceed the savings of reduced storage used.

To avoid this seeming penalty for deleting objects that encompass multiple data units ("data slabs"), a storage appliance can maintain a table of contents for a data slab that identifies the location of constituent data units within the data slab. When a delete of one or more constituent data units is requested, the table of contents can be modified to mark those constituent data units while deferring the actual deletion of the constituent data units. Deferring the deletion avoids incurring the cost of retrieving the data slab and storing a modified version of the data slab back to the cloud storage. Instead, retrieval and modification can be limited to the table of contents either by storing the table of contents in a cloud storage container (e.g., a block or bucket) along with the corresponding data slab. The storage appliance can retrieve the table of contents with a partial read command instead of a command to retrieve an entire data slab. At each requested deletion, the storage application determines whether the amount of constituent data units that have been deleted satisfies a threshold amount to warrant modifying the data slab to carry out the deferred deletions.

Figure 2:
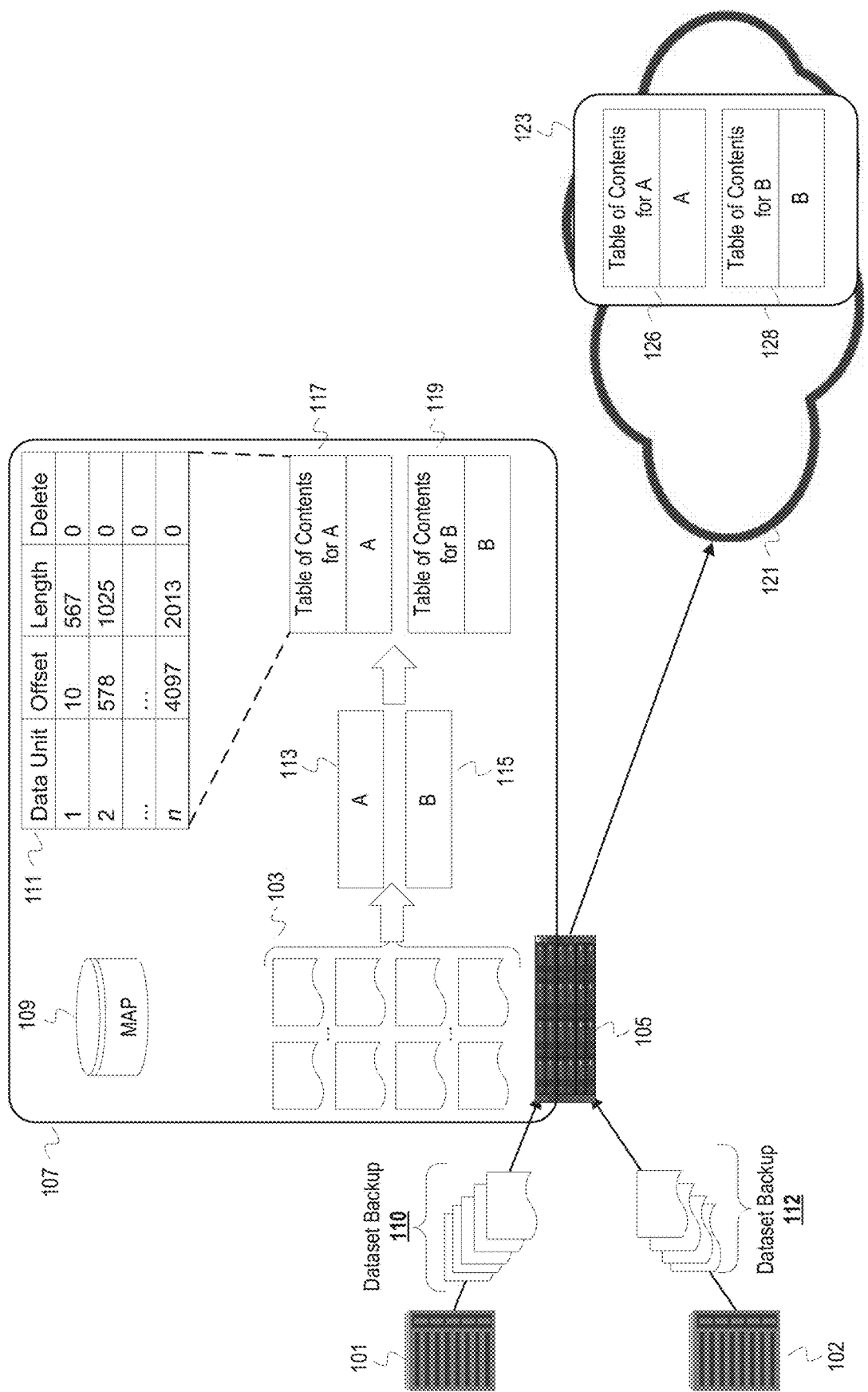
FIG. 2 is an exemplary block diagram illustrating managing cloud storage.

FIG. 2 is a conceptual diagram of a storage appliance creating cloud objects with structures for deferred deletion of data slab constituents. A server 101 streams backup data for a dataset 110 to a storage appliance 105. A server 102 also streams backup data for a dataset 112 to the storage appliance 105. The storage appliance 105 constructs "data slabs" from the streaming dataset backups. To construct a data slab, the storage applications 105 applies multiple transformations to the data. The storage application performance deduplication (e.g., inline, variable length deduplication) on the incoming dataset backups 110, 112. Assuming no restrictions on deduplication across the dataset backups 110, 112, the storage appliance 105 applies deduplication on the collection of data 103, which includes the dataset backups 110, 112. After deduplication, the storage appliance 105 compresses the data and encrypts the compressed data. The storage appliance 105 aggregates the deduplicated, compressed, and encrypted data units until reaching a data slab size or approaching a data slab size. The storage appliance 105 may pad a data slab if the transformed data units do not align with a data slab boundary. Once a data slab is full, the storage appliance 105 begins constructing another data slab. In FIG. 1, the storage appliance 105 constructs a data slab 113 and a data slab 115 after transforming data units from the data collection 103.

While constructing each of the data slabs 113, 115, the storage appliance 105 maintains a table of contents for each data slab. The storage appliance 105 creates a table of contents 117 for the data slab 113 and a table of contents 119 for the data slab 115. FIG. 1 illustrates an expanded partial view 111 of the table of contents 117. The partial view 111 depicts that the table of contents 117 includes identifiers of the constituent data units in a data slab, locations of the constituent data units, and delete bits or flags. The location information can include an offset value and length for each of the constituent data units within a data slab. Initially, the delete bits are set to indicate not deleted, which is a value of 0 in FIG. 1. The storage appliance 105 creates a cloud object 126 with the table of contents 117 and data slab 113, and creates a cloud object 128 with the table of contents 119 and data slab 115.

The storage appliance 105 eventually stores the cloud objects 126, 128 to a cloud storage 121. The storage appliance 105 stores the cloud objects 126, 128 into a cloud container 123. The storage appliance 105 updates a map 109 to map the data slabs to cloud objects for later lookup and access. When the storage appliance 105 receives a request to delete a constituent data unit, the storage appliance 105 will determine the encompassing data slab and access the map 109 to determine the key or name of the cloud object corresponding to the encompassing data slab. The storage appliance 105 also stores the map 109 to the cloud storage 121 to allow access by other appliances. The storage appliance 105 can then communicate a partial read command to the cloud storage 121 to read the table of contents.

Figure 3:
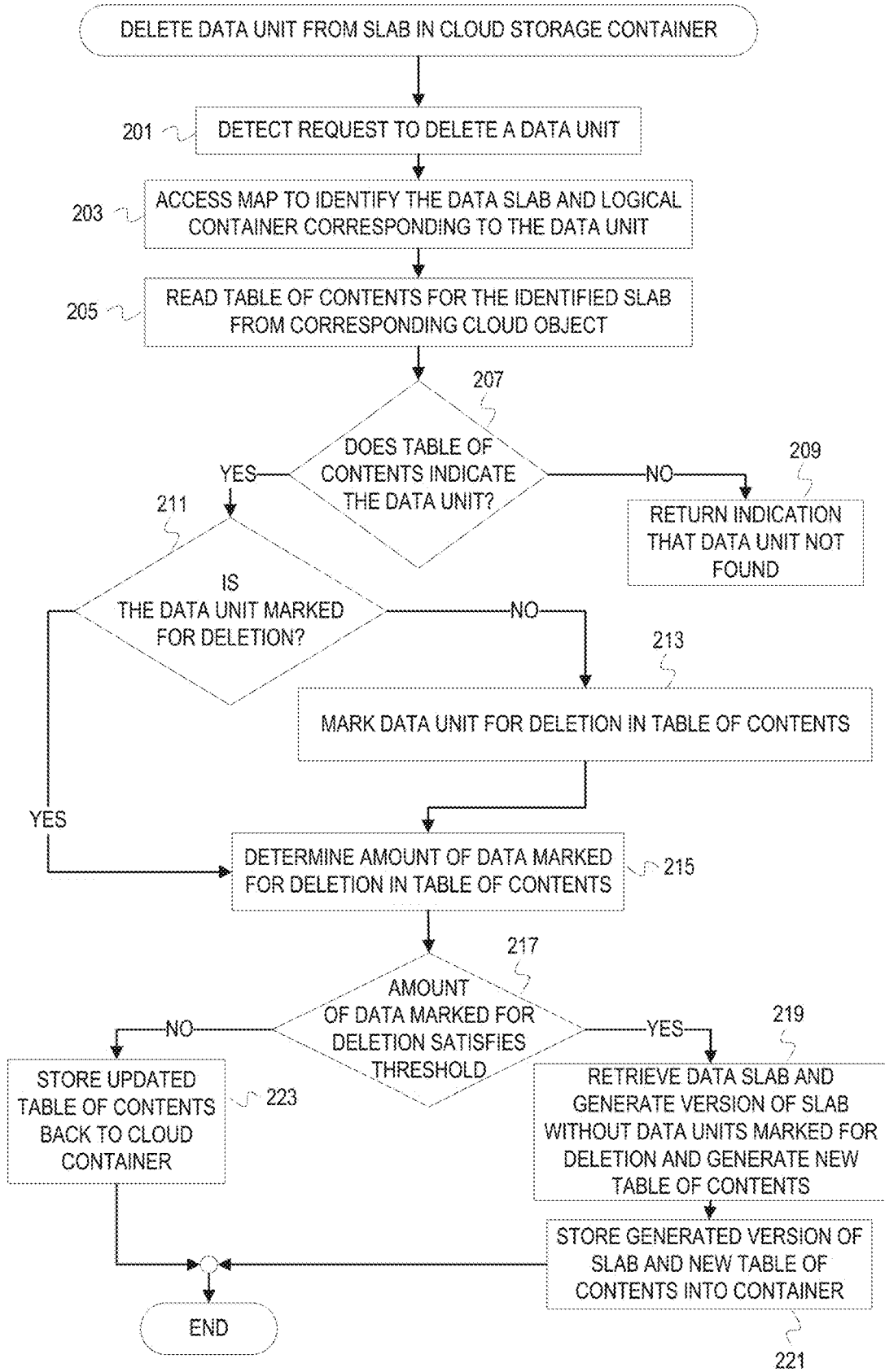
FIG. 3 is an exemplary flowchart illustrating a method for managing cloud storage.

FIG. 3 is a flowchart of example operations for deleting a constituent data unit from a data slab in a cloud storage container. The description of FIG. 3 refers to a storage appliance as performing the example operations for consistency with FIG. 2.

In step 201, a storage appliance 105 detects a request to delete a data unit. In this example, the request includes data associated with a block, file, directory, or volume to delete, although the request can include other types or amounts of information.

Next in step 203, the storage appliance 105 accesses an object map to determine the cloud object corresponding to the data slab in which the data unit has been stored, although other techniques can be used to determine the cloud object.

Next in step 205, the storage appliance 105 reads a table of contents for the data slab from the identified cloud object. As illustrated above, the table of contents includes identifiers of the constituent data units in a data slab, locations of the constituent data units, and delete bits or flags, although the table of contents can include other types or amounts of information. Additionally, the location information can include an offset value and length for each of the constituent data units within a data slab.

In step 207, the storage appliance 105 determines when the table of contents indicates the data unit requested to be deleted. Accordingly, if the storage appliance 105 determines that table of contents indicates that the data unit is not present, then the exemplary flow proceeds to step 209 where the storage appliance 105 returns an indication that the data unit cannot be found.

However, back in step 207, when the storage appliance 105 determines that the table of contents indicates the data unit to be deleted, the exemplary flow proceeds to step 211. In step 211, the storage appliance 105 determines when the data unit is already marked for deletion in the table of contents. Accordingly, if the data unit is already marked for deletion in the table of contents, then the exemplary flow proceeds to step 215.

In step 215, the storage appliance 105 determines the amount of data marked for deletion based on the table of contents.

However back in step 211, if the data unit is not already marked for deletion, then the exemplary flow proceeds to step 213. In step 213, the storage appliance marks the data unit for deletion and the exemplary flow proceeds to step 215.

In step 217, the storage appliance 105 determines when the amount of data marked for deletion in the table of contents satisfies the threshold. Accordingly, if the storage appliance 105 determines that does not satisfy the threshold, then the No branch is taken to step 223. In step 223, the storage appliance 105 stores the updated table of contents back to the cloud storage container at block 223.

However, back in step 217, if the storage appliance 105 determines that the amount of data marked for deletion in the table of contents satisfies the threshold, then the Yes branch is taken to step 219. In step 219, the storage appliance 105 retrieves the cloud object corresponding to the data slab and generates a version of the data slab ("reduced version") without the data units marked for deletion. The storage appliance 105 is carrying out the deferred deletions of the data units from the data slab. The storage appliance 105 also generates a new table of contents for the data slab.

In step 221, the storage appliance 105 stores the reduced version of the data slab back to the cloud storage. The storage appliance also stores the new table of contents to the cloud storage.

In addition to reducing the overhead of deletions by deferring deletions, the cost of reading from cloud storage is also reduced. Based on a read request, a storage appliance 105 determines from the mapping metadata a logical container of a cloud storage account and a cloud object with the data slab that includes the requested data. The storage appliance can limit reading to the table of contents to determine the particular location of the requested data from the layout information in the table of contents and read that specific portion of the cloud object to retrieve the requested data. Although this involves the cost of 2 read transactions, the size of the read is substantially smaller than reading an entire cloud object when cloud objects are on the scale of megabytes and gigabytes.

To maintain ingest capability across different cloud gateways without disruption of ingest, a first cloud gateway can package metadata of data slabs per ingest session and maintain a keystone file to effectively create a snapshot of the session from the perspective of the first cloud gateway. The metadata package includes one or more metadata files for the data slabs of the ingest session and a fingerprint database for the session. An ingest session can be defined by a dataset being streamed to the first cloud gateway for backup or archive (e.g., a backup session or archiving session). An ingest session can be defined by a period of time. The first storage gateway logs the name or identifier of each metadata package (e.g., an object identifier or key) created per session into the keystone file. When a metadata package is successfully stored to cloud storage, the first storage gateway stores the keystone file to cloud storage. If additional metadata packages are created for a session, the first storage gateway updates the keystone file both locally and in cloud storage to indicate the additional metadata packages. Upon keystone commit at completion of the session, the first storage gateway closes the keystone file and makes a final update to the instance in cloud storage and create a new keystone file for a new session. With the keystone file and metadata packages, a second cloud gateway has a snapshot of a session. This can be used for switchover, development testing, etc. without the overhead of rebuilding the fingerprint database and the corresponding costs of rebuilding the fingerprint database.

Figure 4:
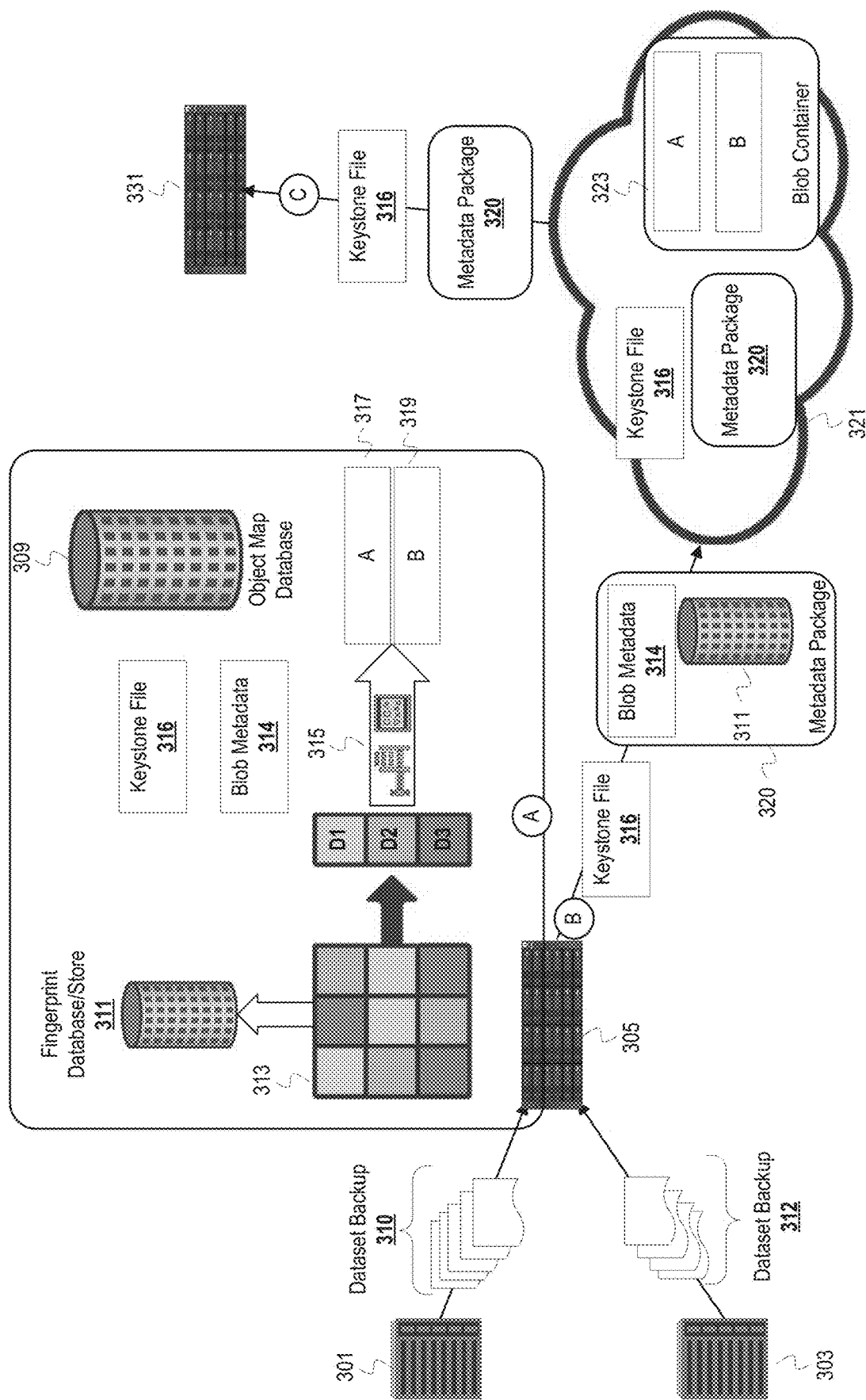
FIG. 4 is an exemplary block diagram illustrating a method for creating metadata packages and a keystone file in cloud storage for consumption by a second cloud gateway.

FIG. 4 is a conceptual diagram of a first cloud gateway creating metadata packages and a keystone file in cloud storage for consumption by a second cloud gateway. A cloud gateway 305 receives one or more datasets in a session, which may be a backup session, archiving session, etc. The cloud gateway 305 receives from a server 301 a stream of a dataset backup 310 and from a server 303 a stream of a dataset backup 312. A deduplication icon 313 represents the cloud gateway 305 performing deduplication on the received data. The cloud gateway 305 creates and maintains fingerprint database/store 311 from the deduplication. The cloud gateway 305 further transforms the deduplicated data by compressing and encrypting the deduplicated data as represented by the arrow 315. This yields data slabs 317, 319. While constructing the data slabs, the could gateway 305 creates blob metadata 314. The blob metadata 314 at least describes layout of the data slabs 317, 319. The blob metadata 314 may also indicate the compression and encryption techniques used. When the session completes and the cloud gateway 305 has successfully stored the data slabs 317, 319 into a blob container 323 in cloud storage 321, the cloud gateway 305 creates a package 320 (i.e., object) with the fingerprint database 311 and blob metadata 314. The cloud gateway 305 then stores the package 320 into cloud storage 321.

Figure 5:
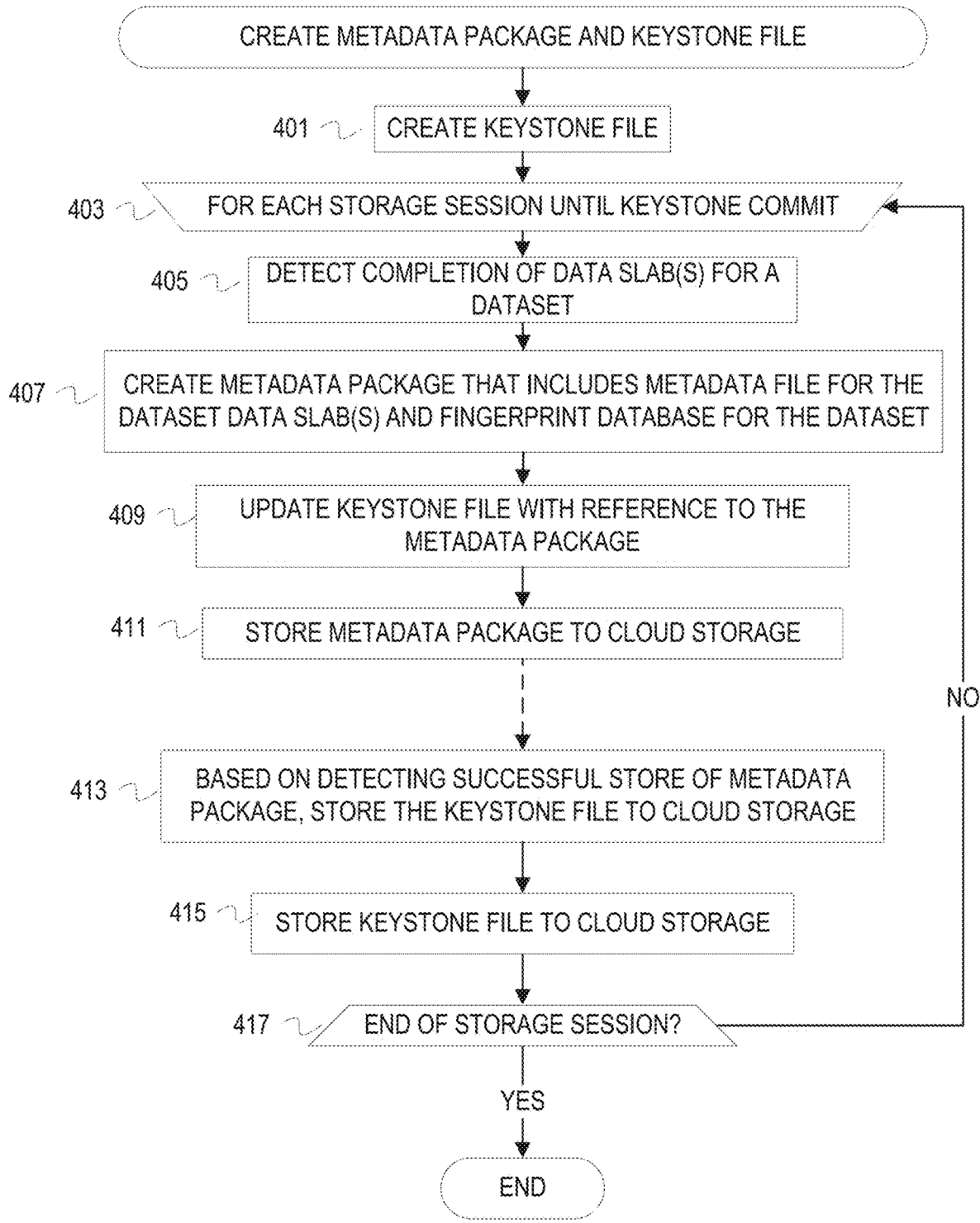
FIG. 5 is an exemplary flowchart illustrating a method for creating metadata packages and a keystone file in cloud storage for consumption by a second cloud gateway.

After successfully storing the package 321 to cloud storage 321, the cloud gateway 305 stores a keystone file 316 into the cloud storage 321. Previously, the cloud gateway 305 created the keystone file 316 for the session and logged each package identifier for the session into the keystone file 316. FIG. 5 only illustrates a single package for the session, but multiple packages can be created for a session. Each of identifier would be logged into the keystone file 316 upon detection of successful store of the package into cloud storage 321. If multiple packages are created for the session, then the cloud gateway 305 may update the keystone file multiple times in cloud storage 321 to ensure that the keystone file 316 in cloud storage 321 is up to date. Alternatively, the cloud gateway 305 may create multiple versions of the keystone file 316 for different time states. The cloud gateway 305 updates and maintains an object map database 309 with names and/or locations of the items stored into the cloud storage 321 to allow later retrieval.

A second cloud gateway 331 can eventually consume the keystone file 316 and the metadata package 320 from the cloud storage. The second cloud gateway can consume these items to have a snapshot of the dataset(s) described by the metadata in the metadata package 320 as observed by the cloud gateway 305. The cloud gateway 331 can begin processing requests relevant to the dataset(s) represented by the package 320 and with the fingerprint database 311. The cloud gateway 305 will have stored the keystone file 316 with a naming convention or object identifier scheme that is predefined and understood by the cloud gateways 305, 311. Thus, the cloud gateway 331 can search the cloud storage 321 for a keystone file based on that convention or identifier scheme without any additional communication overhead between the cloud gateways.

As modifications are made to the dataset, new packages are created and transferred to the cloud gateway 331 ("remote peer") via the cloud storage 321. There will be no overwrites to the existing objects in the object store or in the peer appliances. A new keystone file is created for the modifications. The new keystone file can either replace the older ones or the older keystone files can persist for the already mentioned snapshotting. By restoring these keystone files and metadata packages in the cloud instance, a customer can perform incremental dev-tests. By restoring the keystone and the corresponding metadata packages, we can reconstruct the filesystem on the peer appliances. Once the metadata packages are restored, the peer appliance rehydrates the on-disk databases with the metadata and the fingerprint database.

Although the second cloud gateway 331 has spun up a cloud instance of the dataset(s), the cloud gateway 305 can still be active and be modifying the cloud storage 321 with new keystone files and metadata packages.

For an incremental dev-test, a peer appliance restores the latest keystone file from the cloud storage 321. From the keystone file, the cloud gateway 331 can identify the new metadata packages to be restored from the cloud storage 321 and the metadata packages that are no longer valid since the last dev-test run. The cloud gateway 331 restores the new metadata packages, and rehydrates the on-disk databases. The cloud gateway 331 can then modify the on-disk databases to remove the invalid metadata-package. Afterwards, the cloud gateway 331 can run incremental dev-tests. In some cases, the cloud gateway 331 can efficiently obtain incremental updates by constraining download to differences or deltas between keystone files in the cloud storage 321 and differences/deltas between corresponding metadata packages. The cloud gateway 331 can then merge the differences/deltas downloaded.

With reference to FIG. 5, in step 401, the cloud gateway 305 creates a keystone file. Next in step 403, the cloud gateway for each storage session until keystone is committed performs steps 405-417 which will be further illustrated below. In step 405, the cloud gateway detects completion of data slabs for a dataset. In step 407, the cloud gateway 305 creates metadata package that includes metadata file for the dataset data slab(s) and fingerprints database for the dataset. In step 409, the cloud gateway 305 updates keystone file with reference to the metadata package. In step 411, the cloud gateway stores metadata package to cloud storage. In step 413, the cloud gateway stores the keystone file to the cloud storage based on detecting successful store of metadata package. In step 415, optionally the cloud gateway 305 stores keystone file to the cloud storage, although the cloud gateway 305 can store the keystone file after the storage session has ended. Next in step 417, the cloud gateway 305 determines if the storage session has ended. If the cloud gateway 305 determines that storage session has not ended, then the No branch is taken back to step 403. However, if the cloud gateway 305 determines that the storage session has ended, then the cloud gateway 305 stores keystone file to the cloud storage as illustrated in step 415 and the Yes branch is taken to end the process.

The other benefit from this is when a disaster strikes on the primary deduplication appliance. Since the metadata packages now contain the hashes of the data blocks, the deduplication index will not be lost upon disaster recovery. Data ingest can continue with the hashes in the metadata packages without sacrificing deduplication. Additionally, replication to the standby appliance can be limited to the metadata cloud objects. During disaster, the standby appliance can take over immediately to allow the continuous ingest of data without sacrificing deduplication.

Another benefit that this offers is snapshotting the filesystem. The keystone file offers a snapshot of the filesystem at the point in time that it was created. If the older keystone files are not deleted and the packages referenced by the older keystone file are never deleted, the system can revert/ rollback to that particular keystone file, effectively giving the system a view at the point in time of the older keystone file. Another cloud instance can be spun up in a read only mode which will pull down the metadata replicated up to that point.

Having thus described the basic concept of the technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the technology. Additionally, the recited order of processing elements or sequences, or the use of numbers, letters, or other designations therefore, is not intended to limit the claimed processes to any order except as may be specified in the claims. Accordingly, the technology is limited only by the following claims and equivalents thereto.

What is claimed is:

1. A method comprising:
identifying, by a computing device, a first data slab following a request to delete a data unit associated with the first data slab, wherein the first data slab is stored at a cloud storage device;
determining, by the computing device, when an amount of data identified for deletion in a first table of contents for the first data slab satisfies a threshold, wherein the amount of data is based at least on the data unit associated with the deletion request; and
deferring, by the computing device, deletion of the data unit from the first data slab without retrieving the first data slab from the cloud storage device, and updating, by the computing device, the first table of contents to mark the data unit for deletion, when the determination indicates the amount of data identified for deletion fails to satisfy the threshold.

2. The method as set forth in claim 1, further comprising generating, by the computing device, a second data slab with one or more other data units associated with the first data slab that are unmarked for deletion in the first table of contents, when the determination indicates the amount of data identified for deletion satisfies the threshold, wherein the second data slab has a same identifier as the first data slab.

3. The method as set forth in claim 2, further comprising generating and storing, by the computing device, a second table of contents based on the second data slab, when the determination indicates the amount of data identified for deletion satisfies the threshold amount.

4. The method as set forth in claim 2, further comprising, sending, by the computing device, the second data slab to the cloud storage device for storage after retrieving the first data slab from the cloud storage device to facilitate generation of the second data slab.

5. The method as set forth in claim 1, wherein the first table of contents identifies a storage location of constituent data units within the first data slab and the constituent data units comprise at least the data unit and the other data units unmarked for deletion in the first table of contents.

6. The method as set forth in claim 3, further comprising storing, by the computing device, the second data slab and the second table of contents into a same cloud storage container, wherein the second table of contents comprises storage locations for constituent data units within the second data slab and the constituent data units comprise only the other data units unmarked for deletion in the first table of contents.

7. A non-transitory machine readable medium having stored thereon instructions for managing cloud storage comprising executable code which, when executed at least one machine, causes the machine to:
identify a first data slab following a request to delete a data unit associated with the first data slab, wherein the first data slab is stored at a cloud storage device;
determine when an amount of data identified for deletion in a first table of contents for the first data slab satisfies a threshold, wherein the amount of data is based at least on the data unit associated with the deletion request; and
defer deletion of the data unit from the first data slab without retrieving the first data slab from the cloud storage device, and update the first table of contents to mark the data unit for deletion, when the determination indicates the amount of data identified for deletion fails to satisfy the threshold.

8. The non-transitory machine readable medium as set forth in claim 7, wherein the machine executable code when executed by the machine further causes the machine to generate a second data slab with one or more other data units associated with the first data slab that are unmarked for deletion in the first table of contents, when the determination indicates the amount of data identified for deletion satisfies the threshold, wherein the second data slab has a same identifier as the first data slab.

9. The non-transitory machine readable medium as set forth in claim 8, wherein the machine executable code when executed by the machine further causes the machine to generate and store a second table of contents based on the second data slab, when the determination indicates the amount of data identified for deletion satisfies the threshold amount.

10. The non-transitory machine readable medium as set forth in claim 8, wherein the machine executable code when executed by the machine further causes the machine to send the second data slab to the cloud storage device for storage after retrieving the first data slab from the cloud storage device to facilitate generation of the second data slab.

11. The non-transitory machine readable medium as set forth in claim 7, wherein the first table of contents identifies a storage location of constituent data units within the first data slab and the constituent data units comprise at least the data unit and the other data units unmarked for deletion in the first table of contents.

12. The non-transitory machine readable medium as set forth in claim 9, wherein the machine executable code when executed by the machine further causes the machine to store the second data slab and the second table of contents into a same cloud storage container, wherein the second table of contents comprises storage locations for constituent data units within the second data slab and the constituent data units comprise only the other data units unmarked for deletion in the first table of contents.

13. A computing device, comprising:
a memory containing machine readable medium comprising machine executable code having stored thereon instructions for managing cloud storage; and
a processor coupled to the memory, the processor configured to execute the machine executable code to cause the processor to:

identify a first data slab following a request to delete a data unit associated with the first data slab, wherein the first data slab is stored at a cloud storage;

determine when an amount of data identified for deletion in a first table of contents for the first data slab satisfies a threshold, wherein the amount of data is based at least on the data unit associated with the deletion request;

defer deletion of the data unit from the first data slab without retrieving the first data slab from the cloud storage device, and updating, by the computing device, the first table of contents to mark the data unit for deletion, when the determination indicates the amount of data identified for deletion fails to satisfy the threshold.

14. The computing device as set forth in claim 13, wherein the processor is further configured to execute the machine executable code to further cause the processor to generate a second data slab with one or more other data units associated with the first data slab that are unmarked for deletion in the first table of contents, when the determination indicates the amount of data identified for deletion satisfies the threshold, wherein the second data slab has a same identifier as the first data slab.

15. The computing device as set forth in claim 14, wherein the processor is further configured to execute the machine executable code to further cause the processor to generate a second table of contents based on the second data slab, when the determination indicates the amount of data identified for deletion satisfies the threshold amount.

16. The computing device as set forth in claim 14, wherein the processor is further configured to execute the machine executable code to further cause the processor to send the second data slab to the cloud storage device for storage after retrieving the first data slab from the cloud storage device to facilitate generation of the second data slab.

17. The computing device as set forth in claim 13, wherein the first table of contents identifies a storage location of constituent data units within the first data slab and the constituent data units comprise at least the data unit and the other data units unmarked for deletion in the first table of contents.

18. The computing device as set forth in claim 15, wherein the processor is further configured to execute the machine executable code to further cause the processor to store the second data slab and the second table of contents into a same cloud storage container, wherein the second table of contents comprises storage locations for constituent data units within the second data slab and the constituent data units comprise only the other data units unmarked for deletion in the first table of contents.

19. The computing device as set forth in claim 13, wherein the processor is further configured to execute the machine executable code to further cause the processor to send the updated first table of contents to the cloud storage device for storage, when the determination indicates the amount of data identified for deletion fails to satisfy the threshold.

20. The computing device as set forth in claim 13, wherein the first table of contents identifies an offset and a length of constituent data units within the first data slab and the amount of data identified for deletion is determined based on the lengths.

* * * * *